UNITED STATES PATENT OFFICE.

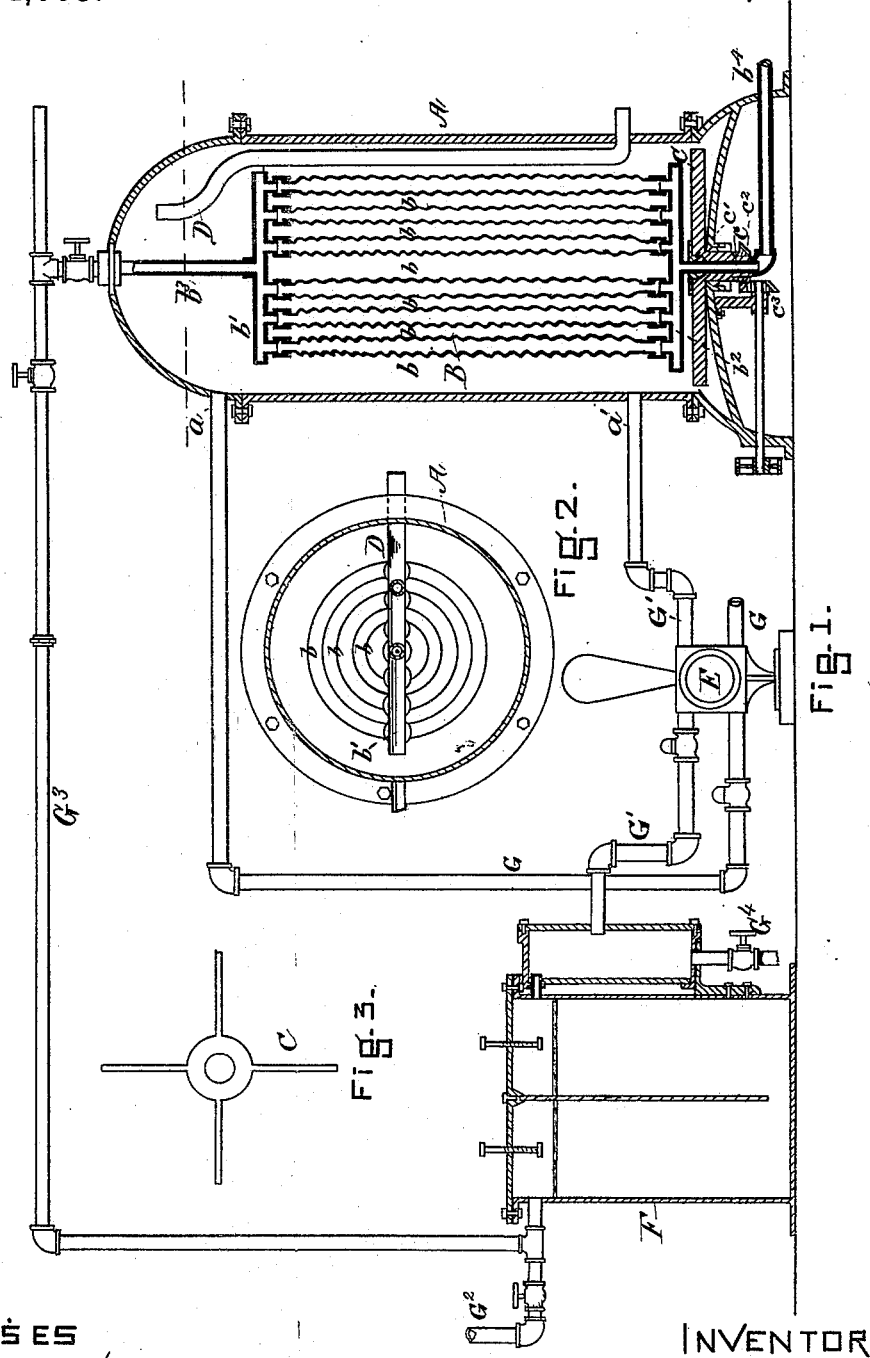

THOMAS WILLIAM DUFFY, OF MEDFORD, MASSACHUSETTS, ASSIGNOR, BY DIRECT AND MESNE ASSIGNMENTS, TO THE WAINWRIGHT MANUFACTURING COMPANY, OF PORTLAND, MAINE.

PROCESS OF PURIFYING WATER.

SPECIFICATION forming part of Letters Patent No. 314,003, dated March 17, 1885.

Application filed February 1, 1884. (No model.)

*To all whom it may concern:*

Be it known that I, THOMAS WILLIAM DUFFY, of Medford, in the county of Middlesex and State of Massachusetts, a subject of her Majesty Queen Victoria, have invented a new and useful Improvement in the Art of Purifying Water, of which the following is a full, clear, and exact description, reference being had to the accompanying drawings, making a part hereof.

The purpose of my invention is to rid water containing carbonates of lime and magnesia of those impurities in such a way that it may be used in boilers without injury. The main requirement of such a process is that the carbonic-acid gas, which the water so often holds in solution, together with that thrown off by the carbonates while they are becoming insoluble under heat, shall be allowed to escape, so that the gas cannot redissolve the carbonates before the water cools sufficiently and the carbonates are separated from it. It is necessary that during the process the water shall not be allowed to absorb any other deleterious matter.

My improvement consists, chiefly, in, first, heating the water to a temperature sufficient to precipitate the carbonates; second, allowing the carbonic-acid gas to escape from the water so heated; third, separating the solids which have been precipitated from the water, the water at all times being so confined that it cannot mix with or absorb any new impurities.

The apparatus necessary for the putting of my process into operation is, first, a heater of some sort with means for heating water to the proper temperature, with an inlet and outlet for the water and an outlet for the carbonic-acid gas; second, suitable means for separating the solids in the water from the water—as, for example, a filter; third, means for keeping up a proper circulation of water through the apparatus. These means may be contained in one machine; but I prefer, for convenience, to separate them, and have shown in the drawings an apparatus which I believe to be most convenient for the purpose, a portion of it being of my own invention, and the subject of application for Letters Patent No. 119,535.

Figure 1 is a vertical section of the apparatus; Fig. 2, a horizontal section of the heater, and Fig. 3 a plan view of the agitator.

A is a feed-water heater, provided with a water-inlet, $a$, near the top, and a water-outlet, $a'$, near the bottom. It is also provided with concentric annular chambers B, formed by the concentric cylinders $b$, for holding the steam, by means of which the water is to be heated. These chambers are closed at one end with the cross-pipe $b'$, and at the other with the cross-pipe $b^2$, the steam-inlet $b^3$ and outlet $b^4$ connecting with these cross-pipes, as shown.

C is an agitator consisting of a number of blades or arms which are attached to a sleeve, $c$, about the steam-outlet $b^4$, and passing through a stuffing-box, $c'$, at the bottom of the heater. This sleeve and agitator are rotated by means of power applied through the gearing $c^2$ $c^3$.

D is a vent-pipe for leading off the steam and carbonic-acid gas which are thrown off from the water. This pipe carries the steam and gas through the water, its mouth being above the level of the water in the heater. This steam and gas may be further utilized for the purposes of heating, if thought desirable.

Water containing carbonates generally contains sulphates as well, which, however, will only precipitate when the temperature is above 212° Fahrenheit; hence it is best that the heater should be capable of heating water to the necessary degree above 212°. When such a course is desirable, the vent-pipe D (which is not shown in section in the drawings) should have a small internal diameter, so as to let the steam and gas blow off without so reducing the pressure in the heater as to prevent the raising of the temperature to a sufficiently high degree to precipitate the sulphates. The internal diameter of this vent in any case must depend upon the heating-surface of the heater used. The larger the heating-surface the larger the vent may be.

E is a double-acting pump for the purposes of maintaining a constant water-level, which shall allow room in the heater for the collection of gas and steam, and also prevent any overflow of water through the pipe D.

F is a filter of suitable construction, through which the water is forced from the heater. The suction-pipe G leads from the reservoir or source of supply to the pump, and from thence into the heater at $a$, and the pipe $G'$ from the heater at $a'$ to the pump and filter. $G^2$ leads from the filter to the boiler. A pipe, $G^3$, provided with a cock is shown joining the pipe $b^3$ and the pipe $G^2$. Under ordinary circumstances the cock in this pipe $G^3$ is closed and the pipe not used. When it is desired to blow steam through the filter for the purpose of cleaning it out, this cock is opened, and the cocks in the pipe $b^3$ and $G^2$ are closed, so that the steam will pass the pipe $b^3$ and into the farther side of the filter, through a portion of the pipe $G^2$, and out through the cock $G^4$ in the chamber on the right of the filter, which has been opened for the purpose.

My process as carried out with this apparatus is as follows: Water is pumped into the heater through the inlet $a'$, and is heated by means of steam or its equivalent circulated through the chambers B. When heated to a sufficient degree, the carbonates in solution will precipitate, throwing off carbonic-acid gas. The water also will throw off any carbonic-acid gas held in solution, and this gas and any steam which may be formed will pass off from the chamber above the water-level through the pipe D. The water, being thus rid of all carbonic-acid gas, cannot redissolve the precipitated carbonates. The agitator C, being rotated, will keep the water in motion and prevent any impurities from settling on any part of the heater. As the pump will maintain a constant water-level in the heater, and as the steam and gas will collect above the water-level with greater rapidity, owing to the large heating-surface, than it can escape through the vent, such being the proportion of heating-surface to the vent in the apparatus, pressure will accumulate in the heater sufficient to enable the temperature of the feed-water to be raised to a high enough degree to cause any sulphates held in solution to precipitate as well as the carbonates. The water will be drawn off into the boiler or other reservoir through the filter F at a proper temperature and the solid matter separated from it. The water should be circulated slowly, so as to give the gas sufficient opportunity to escape. I prefer to draw off the heated water from the bottom of the heater, because less gas will be likely to be carried off with the water, and the absence of the gas is essential to the successful freeing of the water from the carbonates.

As has been said above, the internal diameter of the vent D must be properly proportioned to the heating area in the heater in order that the steam may not escape with too great rapidity, and so reduce the pressure in the heater as to prevent the water from being heated above 212° Fahrenheit and prevent the sulphates from being precipitated. By means of a cock attached to the pipe D the escape through the pipe D can be regulated at pleasure, so as to retain the pressure in the heater necessary to precipitate the sulphates and yet take off the gas, the amount of pressure in the heater being indicated by a gage attached thereto above the water-level. This cock and gage are not shown in the drawings, nor are they necessary parts of the apparatus.

What I claim as my invention is—

1. The process above described of freeing water from carbonates of lime and magnesia insoluble at a high temperature, which consists in heating the water to a temperature sufficient to precipitate the carbonates held in solution, then freeing it from carbonic-acid gas, and then separating from it the insoluble matter, all as set forth.

2. The process above described of freeing water from salts of lime and magnesia insoluble at a high temperature, which consists in heating the water under pressure to a temperature sufficient to precipitate the salts held in solution, at the same time freeing it from carbonic-acid gas and steam, then separating from it the insoluble matter while still at a high pressure and temperature, all as set forth.

3. The process above described of freeing water from salts of lime and magnesia which are insoluble at high temperature, consisting in heating the water under pressure to a temperature sufficient to render said salts insoluble, agitating the water while it is being heated and freeing the water from carbonic-acid gas, and then separating the insoluble particles from the water while it is still at high temperature and pressure, all as set forth.

In testimony whereof I have hereunto subscribed my name this 14th day of November, A. D. 1883.

THOMAS WILLIAM DUFFY.

Witnesses:
J. HENRY TAYLOR,
GEORGE O. G. COALE.